United States Patent [19]

Hood

[11] Patent Number: 5,207,247
[45] Date of Patent: May 4, 1993

[54] METHOD OF TUBE PLUGGING

[76] Inventor: Joy S. Hood, P.O. Box 3758, Plant City, Fla. 33564-3758

[21] Appl. No.: 696,048

[22] Filed: May 6, 1991

Related U.S. Application Data

[63] Continuation-in-part of Ser. No. 411,299, Sep. 22, 1989, abandoned.

[51] Int. Cl.$^5$ .................................... F16L 55/128
[52] U.S. Cl. ........................................ 138/89; 29/451
[58] Field of Search .................... 138/89; 15/104.062; 29/235, 451

[56] References Cited

U.S. PATENT DOCUMENTS

| | | | |
|---|---|---|---|
| 278,612 | 5/1883 | Sharp | 138/89 |
| 1,491,325 | 4/1924 | Thomas | 138/89 |
| 1,715,442 | 6/1929 | Weis | 138/89 |
| 1,803,491 | 5/1931 | Thirty | 29/235 X |
| 1,867,751 | 7/1932 | Oberhuber | 138/89 |
| 2,031,797 | 2/1936 | Tarbox | 29/235 |
| 2,276,443 | 3/1942 | Wilson | 138/89 |
| 2,449,645 | 9/1948 | DuPont | 138/89 |
| 2,457,930 | 1/1949 | Smith | 29/235 |
| 2,830,361 | 4/1958 | Bruner | 29/235 |
| 3,139,677 | 7/1964 | Goldstein | 29/235 |
| 3,200,984 | 8/1965 | Fueslein | 138/89 |

FOREIGN PATENT DOCUMENTS 56-77698  6/1981  Japan ..................... 138/89

Primary Examiner—Harvey C. Hornsby
Assistant Examiner—C. Cooley
Attorney, Agent, or Firm—Charles A. McClure

[57] ABSTRACT

Resilient stoppers are temporarily compressed and are inserted into tubular conduits and then released to expand therein to stop fluid leakage therefrom. Tapered stoppers larger across than tubes to be plugged are inserted by a tapered hollow tool having a large end to receive a stopper and a smaller end inserted within a tubular conduit to be plugged. Application of pressure to the base of the stopper to force it through the tapered tool also compresses it to a temporarily lesser size. Upon leaving the tool end inside the tube, the stopper expands into non-slipping contact with the surrounding wall. Continued pressure, rather than sliding the stopper in the tube, backs the tool end away and out therefrom, leaving the stopper plugging the tube. Stopper embodiments may have one or more tapered portions, or one or more circumferential recesses into which resilient rings fit, and optionally are adapted to lengthen to receive such rings, and to shorten to compress them longitudinally and thereby expand them circumferentially as may be desired.

3 Claims, 2 Drawing Sheets

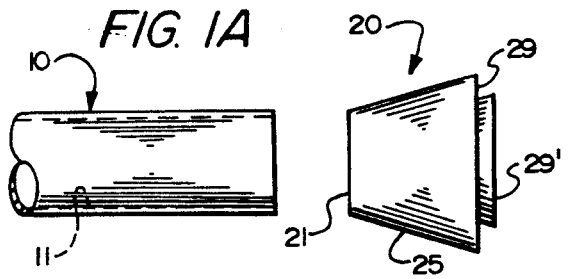
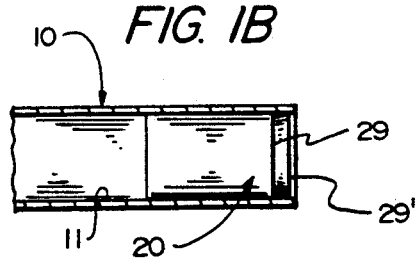
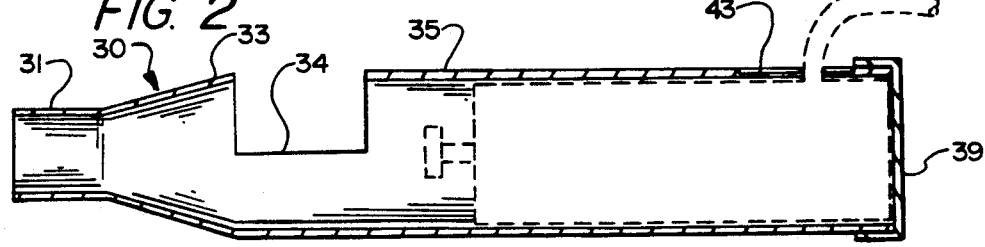
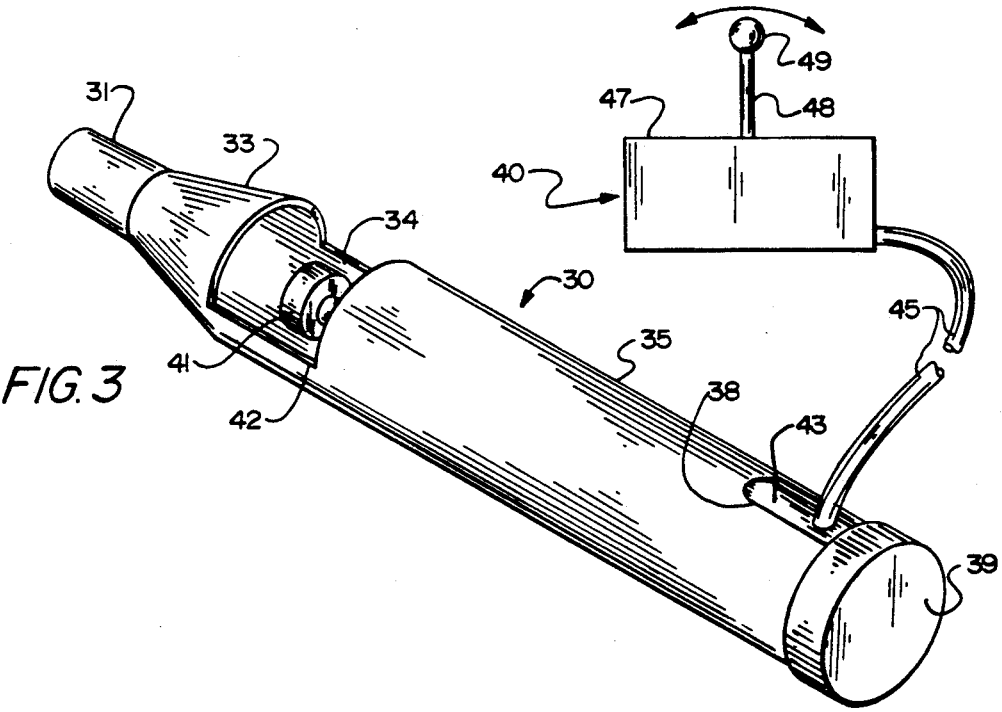
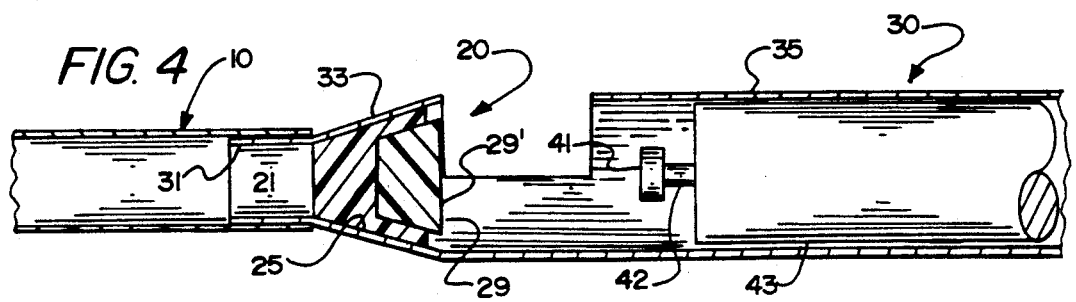

METHOD OF TUBE PLUGGING

This a continuation-in-part of my similarly titled copending patent application, Ser. No. 411,299 filed 22 Sept. 1989. It is incorporated herein in its entirety by this reference—and is to be abandoned after the complete filing of the present application.

TECHNICAL FIELD

This invention relates to tube plugging with plugs or stoppers, such as to block or stop leakage from, or flow through, rigid tubes.

BACKGROUND OF THE INVENTION

Heat exchangers commonly include arrays of substantially rigid tubular conduits interconnected to one another, whether in series or parallel or other configuration, and located collectively between a plurality of liquid or gaseous fluids located respectively inside and outside them at diverse temperatures and pressures. Most often the tubular walls serving as a barrier between one contained fluid and another or between a contained fluid and the surrounding atmosphere are made of metals because of their desired rigidity and heat-conductivity, but some are composed of inelastic graphite. Tubing walls are designedly thin enough for ready heat conduction through them but thick enough to resist deformation conducive to leakage. Heat exchanger tubes must resist long periods of sustained pressure and temperature and numerous cycles between diverse pressures and temperatures without leaking. Other substantially rigid tubular conduits, not primarily heat exchangers., such as are used especially in chemical processing plants, contain a variety of fluids capable of considerable physical damage and personal injury if allowed to leak.

In the event of leakage, prompt efforts are often made to plug all leaking tubes, so as to continue operations, facilitate maintenance, protect the environment, save the contents (and money), etc. Plugging is complicated under any circumstances and is especially difficult where, as is common, the tubular interior is under much higher pressure than the exterior. Plugs satisfactory at low inside pressures may leak or even be blown out at higher pressures.

Existing methods of attacking this problem focus upon inserting the smaller end of a tapered stopper manually into the bore of such tubular conduit and applying force to its larger end, usually intermittently as by hammering it, until a substantial part or all of the stopper has entered the bore. Unfortunately, such procedure can not lodge a stopper sufficiently tightly to preclude subsequent leakage or outright expulsion of the stopper at high fluid pressure inside.

Surfaces of tubing walls and entrances in heat exchangers and chemical processing equipment are often made irregular by corrosion, erosion, scaling, and like occurrences. Forcing stoppers thereinto or therealong abrades them and is deleterious to effective plugging.

Examples of plugging means and methods using such objectionable forcing of stoppers into or along such tubing entrances or walls are found in Sharp U.S. Pat. No. 278,612 and in Japanese patent application 54-153807 of 29 Nov. 1979 published as 56-77698 on Jun. 26, 1981.

Similar insertion of circumferentially grooved cushion pads into apertures in sheet material, for retention with their opposite ends protruding at both sides of the sheet, is disclosed in Smith U.S. Pat. No. 2,457,930, where no leakage issue was presented or solved.

Tubing with walls insufficiently rigid (appreciably flexible) that they will expand at some internally applied fluid pressures cannot be effectively plugged by introducing stoppers thereinto so long as the wall can expand appreciably beyond the plug at higher applied internal pressures. Flexible tubings can have cleaning plugs forced therethrough by air or similar propellant fluid, with or without added lubricant, as in Weis U.S. Pat. No. 1,715,442, or can receive moderately soft or hard inserts therein, as in Bruner U.S. Pat. No. 2,830,361 (rigid sleeve of glass or the like inside rubber or like flexible tube) and Goldstein U.S. Pat. No. 3,139,677 (weatherstripping inside flexible sheath). Because of their inherent expansibility flexible tubes cannot be rendered leakproof by such means or method.

My present invention is directed to plugging whatever tubular conduits are sufficiently rigid to retain plugging stoppers over the range of temperatures and pressures designed for or subjected to.

SUMMARY OF THE INVENTION

A primary object of the present invention is to provide methods of plugging tubular conduits despite high pressures present therein.

Another object of this invention is to provide resilient stoppers adapted for insertion by such methods to plug tubular conduits.

A further object of the invention is to provide insertion apparatus adapted to plug tubes by such methods with such stoppers.

In general, the objects of this invention are accomplished, in plugging the bore of a rigid tubular conduit with a resilient stopper larger in transverse section than the bore but compressible to lesser size, by inserting the stopper while at such lesser size into the bore without sliding the stopper against the entrance or inside wall defining the bore, and then releasing the stopper inside the bore to expand into plugging contact against the wall.

For example, the smaller tubular open end of a tapered tool is inserted snugly inside a bore to be plugged, and a larger stopper is forced along and compressed therein to a temporarily lesser size, until emerging from the inserted end of the tool and expanding into non-sliding contact with the inside wall, thereby plugging the bore. Contact of the expanded leading end of the stopper with the wall halts forward movement of the stopper, so further expulsion of the stopper from the small end of the tool backs the tool from the bore.

Other objects of the present invention, together with means and methods for attaining the various objects, will be apparent from the following description and accompanying diagrams of preferred embodiments, which are presented by way of example rather than limitation.

SUMMARY OF THE DRAWINGS

FIG. 1A is a side elevation of a tubular conduit (more simply, a tube) to be plugged and of a first embodiment of stopper juxtaposed thereto, to be inserted into the tube so as to plug it;

FIG. 1B is a side elevation partly in section of the tubular conduit of FIG. 1 plugged with the stopper shown in that same view;

FIG. 2 is a side sectional elevation of a tool useful according to this invention to insert the stopper embodiment of FIG. 1 into the tube of FIG. 1;

FIG. 3 is a perspective view of the tool of FIG. 2 supplemented by pressurizing means for inserting such a plug into such a tube according to this invention;

FIG. 4 is a longitudinal sectional elevation of the preceding apparatus loaded with a stopper of FIG. 1 to plug a tube of FIG. 1;

DESCRIPTION OF THE INVENTION

Figure 5A:
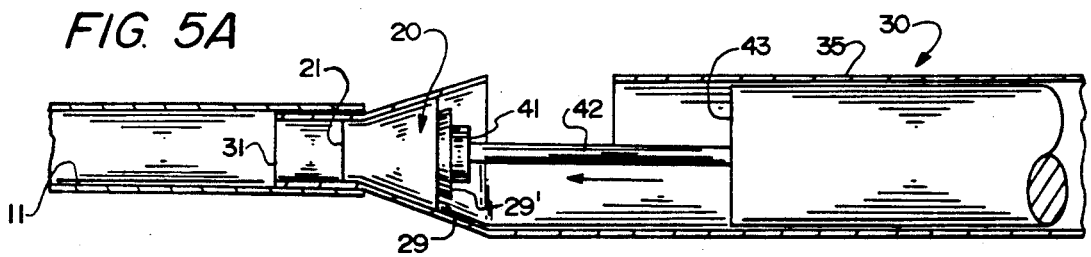
FIG. 5A is a fragmentary longitudinal sectional elevation through the apparatus of the preceding views at an early stage of inserting a stopper into a tube.

FIG. 1A shows fragmentarily, from the side, substantially rigid tubular conduit 10 having bore 11 (dashed lines) therethrough. Near the right end and outside of the tubular conduit is stopper 20 with small end 21, tapered body 25, and large end 29. This stopper has somewhat smaller base 29' protruding slightly to the right. The small end of the stopper, nearer the tube end, is shown larger across than the outside tubular dimension and, thus, larger than the bore or inside cross-section of the tube. The stopper is selected as resilient enough to be compressible to sufficiently small size to be inserted into the tubular bore, and allowed to expand to plug it.

FIG. 1B shows same bore 11 after being plugged by stopper 20.

FIG. 2 shows, also from the side, tool 30 useful in inserting stopper 20 into bore 11 of tubular conduit 10 according to this invention. This inserting tool is generally cylindrical and has at the left in this view open-ended minor cylindrical portion 31 adapted to fit snugly into the bore of a tube to be plugged, such as was shown in the preceding view. The tool has, at the right, major cylindrical portion 35, closed in this view by removable end cap 39, conveniently screwed thereonto (threading not shown). Intermediate tapered cylindrical body portion 33 of the tool interconnects its major and minor end portions. Major cylindrical end portion 35 has semi-cylindrical notch 36 therein at its junction with the tapered portion and has small opening 38 near the end cap to admit pressure line 45 from the outside to pressure means (dashed lines) inside.

FIG. 3 shows, in perspective, tool 30 of the preceding view and pressurizing system 40, which features pressure head 41 (visible via notch 36 in body 35 of the tool) on the free end of push-rod 42 of hydraulic cylinder 43 (fragmentarily visible via slot 38 in the tool body) fitting removably therein, retained by body end cap 39. Also in the pressurizing system is line 45 to the hydraulic cylinder from control module 47, which mounts lever arm 48 terminating at its free end in ball grip 49 and movable to and fro as indicated by arrows. It will be understood that such cranking movement is effective to apply fluid pressure to the push rod so as to extend it and in doing so to bring the pressure head forcibly to bear upon a stopper when present in the tapered portion of the tool.

FIG. 4 shows, in longitudinal (axial) section, tool 20 with its small end 31 fitting within the end of the bore of tubular conduit 10 and with hydraulic cylinder 43 of the pressurizing system fitting in body portion 35 of the tool, with push-rod 42 retracted sufficiently (from its partially extended position in FIG. 3) for pressure head 41 to clear notch 34. Fitting in tapered portion 33 of the tool is stopper 20, in position for base 29 of the stopper to be contacted by pressure head 41 upon sufficient extension of the push rod from the hydraulic cylinder, as produced by manual pivoting of lever arm 48 of the pressurizing system of the preceding view.

Figure 5B:
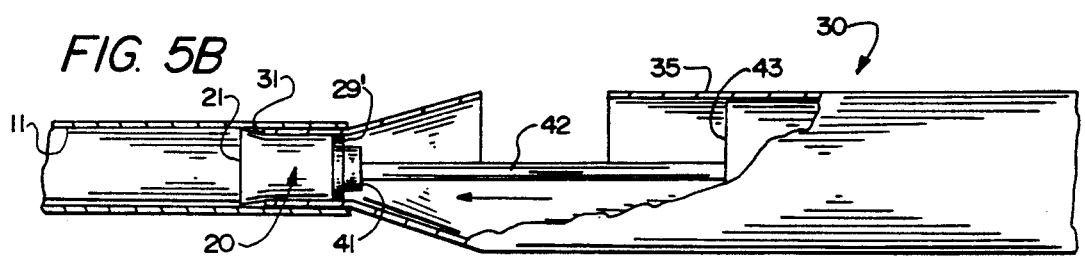
FIG. 5B is a view similar to 5A but at an intermediate stage of inserting a stopper into a tube.
Figure 5C:
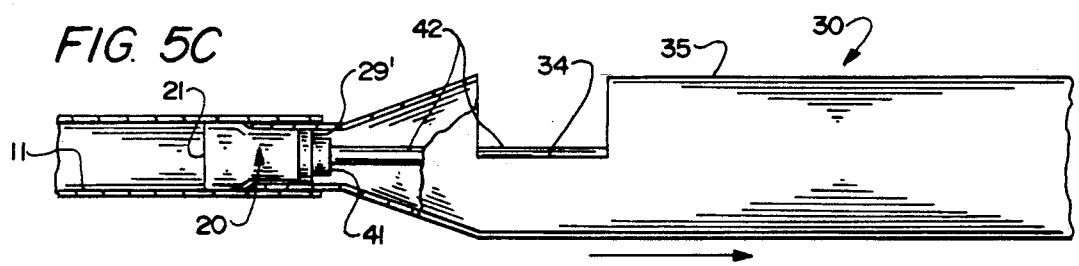
FIG. 5C is a view similar to FIGS. 5A and 5B but at a final stage of inserting a stopper into a tube.

FIGS. 5A, 5B, and 5C make up a sequence of side sectional or partly cut-away views, oriented like FIG. 4, illustrating insertion of resilient stopper 20 into bore 11 of tubular conduit 10 to plug it. The method of the present invention is readily understood by considering these successive views and the following description.

Thus, in FIG. 5A, leading end 21 of the stopper, having been compressed to smaller transverse size upon being pushed (arrow) by push-rod 42 into and through tapered portion 33 of the tool, is just entering cylindrical small end 31 of tool 30, whose full length fits snugly within bore 11 and is a bit longer than the stopper itself.

In FIG. 5B, stopper 10 has been propelled forward and its whole body has been so compressed through tapered portion 33 of the tool and into its small cylindrical end 31. Continued action (arrow) of push-rod 42 is forcing leading end 21 of the stopper to emerge from the tool end, to expand against the wall of the bore to be plugged.

In FIG. 5C, stopper 10 has emerged in part from end 31 of the tool and has expanded into non-sliding contact with the inside wall of bore 11. Continued extension of push-rod 42 backs (arrow) the tool end out of the bore, leaving the tube plugged by the stopper.

Thus, the tool, besides compressing the stopper and forwarding it at reduced size, precludes abrasion between wall and stopper.

The small end of the stopper is preferably larger than the bore of the tubular conduit to be plugged, and the tool taper and the stopper taper are substantially alike. Stopper embodiments may have a plurality of such tapered portions, or one or more circumferential recesses into which resilient rings fit, and may even be adapted to lengthen to receive such rings and to shorten to compress them longitudinally and to expand them circumferentially as may be desired.

The following views of additional embodiments of stopper useful in like manner according to the present invention denote like parts (or analogous parts) by reference numerals differing by one or more hundred from the reference numerals used for the first embodiment. Non-analogous or unlike parts are designated by higher reference numerals higher by one or more hundred than numbers not yet used. In this way previous mention or description can suffice for unchanged items, and added mention or description be confined to new matters.

Figure 6:
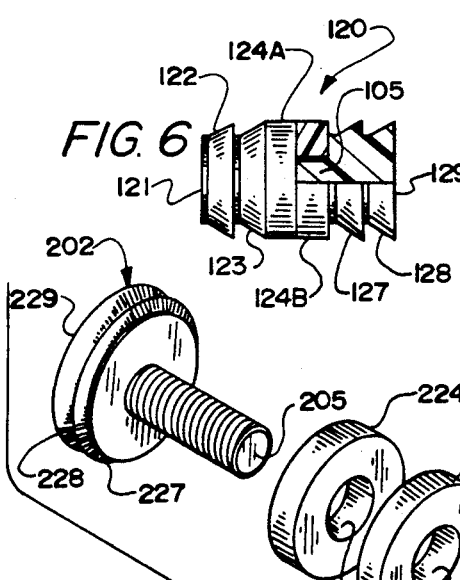
FIG. 6 is a side elevation, partly cut away, of a second embodiment of stopper according to this invention.

FIG. 6 shows, from the side and partly sectioned away, second resilient stopper embodiment 120, different in several respects from stopper 20 of preceding views. Instead of a long tapered side from forward end 121 to aft end 129, stopper 120 has a plurality of short taper-sides segments at intervals: forward segments 122 and 123, then circumferentially recessed portion 105, and then aft segments 127 and 128. Resilient rings 124A and 124B fit side by side within the annular recess around recessed portion 205 of stopper 120. The outer surface of each ring is about as far from the longitudinal axis of the stopper as the extremities of the tapered segments are.

Figure 7:
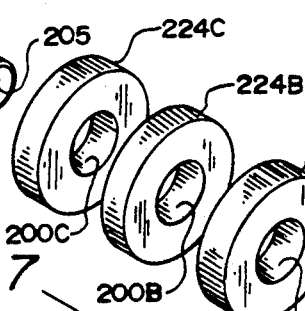
FIG. 7 is a longitudinally exploded perspective view of a third embodiment of plug according to this invention.

FIG. 7 shows, in exploded perspective, third resilient stopper embodiment 220. This stopper has quite a different orientation, as it tapers down toward the near lower right of the view instead of directly toward the left as in views of the previous embodiments. It has quite a few parts, including forward piece 201 comprising successive tapered segments 222, 223 with front threaded bore 200 therethrough and thus through front end face 221; and aft piece 202 comprising tapered segments 228, 229, the former having rod portion 226 projecting forward therefrom with at least its front part threaded, and the latter with rear end face 229 (an edge visible).

Located at intervals between the forward and aft pieces of stopper 220 in FIG. 7 are resilient rings 224a, 224b, 224c, with respective bores 224a, 224b, 224c therethrough large enough to admit rod 205 so as to thread into bore 200 in forward piece 201. It will be understood that, in being assembled into stopper form, the three rings will be slid onto the threaded rod, and the forward piece will be screwed thereonto to a desired degree, at least snug enough to bring the assembled components into mutual contiguity and optionally sufficiently greater to preload the rings, compressing them in the longitudinal axial direction—and expanding them radially outward.

Figure 8A:
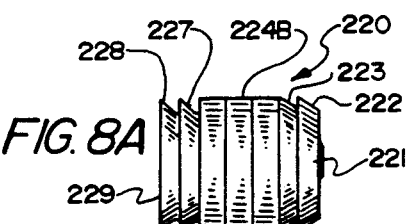
FIG. 8A is a side elevation of the stopper embodiment of FIG. 7 in assembled form, without endwise compressive preloading.
Figure 8B:
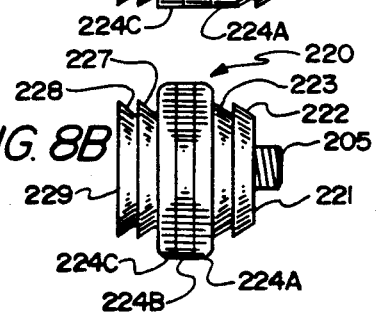
FIG. 8B is a side elevation of the stopper embodiment of FIG. 7 in assembled form, under endwise compressive preloading.

FIGS. 8A and 8B show, from the side, stopper 220 of FIG. 7 with its respective parts all assembled into stopper form. In FIG. 8A, forward end piece 201 has been screwed onto threaded rod 205 just enough to bring successive parts together snugly, with the outer edges of rings 224a, 224b, and 224c flush with the outermost extremities of tapered segments 223, 224, 227, and 228. However, in FIG. 8B, the forward piece has been screwed further onto rod 205, compressing the rings axially and expanding them radially beyond the tapered extremities of the forward and aft tapered pieces. Respective radial extents in these views are somewhat exaggerated, rather than to scale, for the purpose of pictorial emphasis.

For best results in the practice of this invention, the angle of taper (measured relative to the longitudinal axis) is within the range from about one dozen to several dozen degrees, preferably in the near vicinity of a couple dozen degrees. The taper of the insertion tool should be within at most about several degrees of the stopper taper and, in the event of any deviation, preferably a bit less taper in the tool rather than a bit more than in the stopper.

Resilient materials for the stoppers are readily available and include natural and synthetic rubbers or other elastomeric polymers. Examples include saturated and unsaturated polyhydrocarbons (such as polyethylene and polypropylene), halogenated hydrocarbons (such as polytetrafluoroethylene), polyamides (such as nylon 6, nylon 612), polycarbonates, polyesters, polyvinyls (such as polyvinylchloride, polyvinylidene chloride, and their copolymers), etc. The stopper material(s) should be resistant, of course, to attack by whatever fluid—whether liquid or gas—may be in the tubes to be plugged.

The stoppers may be homogeneous, with or without optional surrounding rings, or may have a base portion somewhat harder than the forward or outer portion, as in the first embodiment. They may have a single taper, as in the first embodiment, or multiple tapers, as in the second and third embodiments. Multiple tapers are useful for the harder compositions or when surrounding rings are to be added, whether preloaded by lengthwise compression or not. Preloading is advantageous with one or more rings, an with composition(s) having a higher coefficient of friction than the stopper body composition.

The various chemical and physical characteristics of the illustrated and described stopper embodiments may be mixed or matched as desired to cope with whatever fluid composition, pressure, or temperature, or whatever tubular conduit roughness or smoothness, size, or temperature may be encountered. Higher pressures require tighter fit of the stoppers, of course, to prevent being dislodged. Preloading and harder compositions are conducive to improvement in plugging at higher pressures. For a good tight fit the stopper must be larger at its smallest end than the tubular bore to be plugged. The longitudinal rod of multiple-component stoppers may be made of the same composition as the base f the stopper or, especially where considerable preloading is useful, are advantageously composed of a metal, such as stainless steel.

Although the stoppers illustrated here are round in transverse section, it will be understood that bores with other cross-sections (e.g., square, other rectangular, or other polygonal) may be plugged also. Indeed, polygonal bores with a half dozen or more sides usually may be plugged effectively with stoppers having a round transverse cross-section. The taper of a stopper may be more when the composition is softer than when it is very hard. The taper should be matched to the desired size and type of stopper rather than trying to make one taper fit all, although for most jobs a single taper will accommodate such a variety of stopper materials that in practice a single taper selected from a range between about twenty to thirty degrees will be suitable much of the time.

The portable pressurizing means is not special to this use but is an article of commerce, as under the brand name "Porta-Power" of the Heinz Werner company of Waukesha, Wisc. If desired, such a device could be built into on-site maintenance equipment, instead of being carried along or provided separately at each site.

The insertion tool itself should be sufficiently strong to withstand the expansion force exerted as stoppers are compressed to smaller diameter in the tapered barrel portion. Aluminum is less satisfactory than steel in this regard. The stronger a cylindrical end at the small end of the taper, the less difficulty will arise in the field by premature compression of the stopper with incomplete insertion of the cylindrical end—or too loose a fit—in the tubular conduit to be plugged. Negligent partial insertion or poor fit is conducive to fracturing of whatever cylindrical part remains outside the conduit. The tapered part can be rib-reinforced, if necessary, but the cylindrical end is necessarily smooth and relatively thin.

The advantage of having such a simple and effective method of plugging leaking tubes is so great that, once demonstrated, it becomes the standard. No one wants to return to the old way of having to drive stoppers with an end smaller than the tubular into the bore manually or even with mechanical assistance, because everyone knows that the resulting fit is not tight enough with the manual method.

The claimed invention

1. Method of plugging a bore—bounded by an inelastic inside wall of a conduit—with a resilient stopper normally larger in transverse section than the bore but compressible to lesser size, comprising the steps of compressing the stopper transversely to such lesser size, by pushing the resilient stopper through a rigid tool member tapering from an inlet portion larger than the normal transverse section of the stopper to an open-ended cylindrical portion of the rigid tool member smaller than the defined bore and as long as the stopper;

inserting the stopper substantially its entire length into the bore while at such lesser size and out of contact with the wall, by sliding the cylindrical portion of the rigid tool member thereinto, with the resilient stopper compressed to smaller size in the tool;

releasing the stopper in progressive manner from its leading end to its trailing end within the bore to expand progressively and plug the bore, by pushing the compressed resilient stopper progressively out from the cylindrical portion of the tool to expand into non-sliding contact with the conduit wall and by continued pushing simultaneously backing the cylindrical portion progressively but out of the bore.

2. Method of plugging a tubular bore bounded by an inelastic inside wall of a conduit with a resilient stopper normally larger in transverse section than the bore but compressible to lesser size, comprising the steps of:

compressing the stopper transversely to such lesser size, inserting the stopper substantially its entire length into the bore which at such lesser size and out of contact with the wall, and releasing the stopper in progressive manner from its leading end to its trailing end within the bore to expand progressively and plug the bore: including accomplishing the compressing step by pushing the resilient stopper through a rigid room member tapering from an inlet portion larger than the normal transverse section of the stopper into an open-ended cylindrical portion of the rigid tool member smaller than the defined bore and as long as the stopper, accomplishing the stopper inserting step by sliding the cylindrical portion of the rigid tool member, with the resilient stopper compressed to such smaller size therein, in the bore, accomplishing the releasing step by pushing the compressed resilient stopper progressively out from the cylindrical portion of the rigid member to expand into non-sliding contact with the conduit will while backing the cylindrical portion progressively out of the bore.

3. Method according to claim 2, wherein the withdrawing of the cylindrical portion of the rigid tool is accomplished by pushing on the compressed resilient stopper until all of the stopper has been released, from the forward end of the cylindrical tool in the tubular bore, into contact with the wall and all of the cylindrical portion has been backed out of the bore.

* * * * *